(12) United States Patent
Kim et al.

(10) Patent No.: US 12,001,952 B2
(45) Date of Patent: Jun. 4, 2024

(54) ELECTRONIC DEVICE AND METHOD FOR CONTROLLING ELECTRONIC DEVICE

(71) Applicant: SAMSUNG ELECTRONICS CO., LTD., Suwon-si (KR)

(72) Inventors: Jiman Kim, Suwon-si (KR); Chanjong Park, Suwon-si (KR); Dongha Bahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 483 days.

(21) Appl. No.: 17/281,885

(22) PCT Filed: Oct. 8, 2019

(86) PCT No.: PCT/KR2019/013172
§ 371 (c)(1),
(2) Date: Mar. 31, 2021

(87) PCT Pub. No.: WO2020/091253
PCT Pub. Date: May 7, 2020

(65) Prior Publication Data
US 2021/0397890 A1 Dec. 23, 2021

(30) Foreign Application Priority Data
Oct. 29, 2018 (KR) .......................... 10-2018-0130209

(51) Int. Cl.
*G06N 3/02* (2006.01)
*G06F 18/213* (2023.01)
(Continued)

(52) U.S. Cl.
CPC .............. *G06N 3/08* (2013.01); *G06F 18/213* (2023.01); *G06F 18/214* (2023.01);
(Continued)

(58) Field of Classification Search
CPC ............ G06N 3/08; G06N 3/02; G06N 3/044; G06N 3/045; G06N 3/084; G06F 18/213;
(Continued)

(56) References Cited

U.S. PATENT DOCUMENTS

2011/0085739 A1 4/2011 Zhang et al.
2016/0117587 A1 4/2016 Yan et al.
(Continued)

FOREIGN PATENT DOCUMENTS

KR 10-2015-0104646 A 9/2015
KR 10-1562988 B1 10/2015
(Continued)

OTHER PUBLICATIONS

Hyungwon Choi, "Exploiting Hierarchical Structure of Classes in Object Classification using Deep Convolutional Neural Networks", Kaist, Issue Date 2015 (Approved on Dec. 17, 2014), pp. 1-31 (40 pages total).
(Continued)

*Primary Examiner* — Chuong A Ngo
(74) *Attorney, Agent, or Firm* — Sughrue Mion, PLLC

(57) ABSTRACT

Disclosed are an electronic device and a method for controlling an electronic device. Specifically, the present disclosure relates to: an electronic device configured to input an acquired image into a trained artificial intelligence model, acquire information about the image from a plurality of classifiers which are included in the artificial intelligence model and correspond to a plurality of layers classified according to higher and lower concepts of an object included in the image, train the artificial intelligence model on the basis of the information about the acquired image, and perform image recognition by using the trained artificial intelligence model; and a method for controlling an electronic device.

13 Claims, 14 Drawing Sheets

(51) Int. Cl.
*G06F 18/214* (2023.01)
*G06F 18/2431* (2023.01)
*G06N 3/08* (2023.01)
*G06V 10/764* (2022.01)

(52) U.S. Cl.
CPC ........... *G06F 18/2431* (2023.01); *G06N 3/02* (2013.01); *G06V 10/764* (2022.01)

(58) Field of Classification Search
CPC .. G06F 18/214; G06F 18/2431; G06F 18/254; G06F 18/24; G06V 10/764; G06T 3/40
See application file for complete search history.

(56) References Cited

U.S. PATENT DOCUMENTS

| | | | |
|---|---|---|---|
| 2017/0220904 A1 | 8/2017 | Bai et al. | |
| 2018/0268234 A1 | 9/2018 | Yang et al. | |
| 2020/0013155 A1* | 1/2020 | Putman | G06T 3/4038 |

FOREIGN PATENT DOCUMENTS

| | | |
|---|---|---|
| KR | 10-1688458 B1 | 12/2016 |
| KR | 10-2017-0077183 A | 7/2017 |
| KR | 10-2017-0091140 A | 8/2017 |
| KR | 10-2018-0051367 A | 5/2018 |
| KR | 10-1863196 B1 | 6/2018 |
| KR | 10-2018-0080098 A | 7/2018 |
| KR | 10-1870718 B1 | 7/2018 |

OTHER PUBLICATIONS

Written Opinion (PCT/ISA/237) dated Jan. 22, 2020 by the International Searching Authority in International Application No. PCT/KR2019/013172.
International Search Report (PCT/ISA/210) dated Jan. 22, 2020 by the International Searching Authority in International Application No. PCT/KR2019/013172.
Communication dated Aug. 21, 2023 issued by the Korean Intellectual Property Office in Korean Application No. 10-2018-0130209.
Heejoon Choi, "Estimation of the Urban Forest Growth Using Multi-temporal LiDAR Dataset"; Seoul National University, Feb. 2018, pp. 1-80 (Total 92 pages).
Communication dated Feb. 28, 2024, issued by Korean Intellectual Property Office in Korean Patent Application No. 10-2018-0130209.

* cited by examiner

ELECTRONIC DEVICE AND METHOD FOR CONTROLLING ELECTRONIC DEVICE

TECHNICAL FIELD

The disclosure relates to an electronic device and a method for controlling an electronic device, and more particularly to an electronic device for performing image recognition and a method for controlling the same.

BACKGROUND ART

In recent years, image recognition technology based on artificial intelligence has been dramatically developed and applied to various industrial fields. Particularly, the artificial intelligence-based image recognition technology is applied to various industrial fields such as, not only an image search service, but also image security control system, autonomous driving vehicle field, and the like.

However, despite of continuous development, the image recognition technology of the related art has a limit in its accuracy. In particular, in recent years, there are efforts for improving a structure of an artificial intelligence model, efforts for improving accuracy of the image recognition by joint-training of entire pipeline of a plurality of artificial intelligence models, and the like, but the technology level with a higher accuracy is still required.

In addition, in the image recognition technology of the related art, field data features of various technical fields are not efficiently reflected, and accordingly, wide needs of various industrial fields are not satisfied.

Therefore, there is need for image recognition technology for efficiently reflecting field data features of various technical fields while having a higher accuracy.

DISCLOSURE

Technical Problem

The disclosure has been made in view of the needs described above and an object of the disclosure is to provide an electronic device which performs image recognition for efficiently reflecting field data features of various technical fields while having a higher accuracy, and a method for controlling the electronic device.

Technical Solution

In order to achieve the object described above, according to an embodiment of the disclosure, an electronic device includes a memory including at least one instruction and a processor configured to be connected to the memory to control the electronic device.

The processor, by executing the at least one instruction, may be configured to obtain an image, and obtain information regarding the image by inputting the obtained image to a trained artificial intelligence model, and the artificial intelligence model may include a plurality of classifiers respectively corresponding to a plurality of classes divided according to higher and lower concepts of an object included in the image, and may be configured to obtain information regarding the image from each of the plurality of classifiers.

The plurality of classes may include a plurality of categories for classifying the object included in the image for each of the plurality of classes, and the information regarding the image may include information regarding a category corresponding to the object included in the image from among the plurality of categories included in each of the plurality of classes.

The processor may be configured to obtain a plurality of loss function values corresponding to each of the plurality of classes based on information regarding the image obtained from each of the plurality of classifiers, and train the artificial intelligence model by performing backpropagation of a total loss function value obtained by adding up the plurality of loss function values so that the total loss function value becomes a minimum value.

The processor may be configured to obtain a feature value of the image by inputting the image to the artificial intelligence model, and obtain information regarding the image from each of the plurality of classifiers by inputting the obtained feature value of the image to the plurality of classifiers.

The plurality of classes may include a first class and a second class including a plurality of subcategories of each of a plurality of categories included in the first class, and the processor may be configured to identify a category corresponding to the object included in the image from among the plurality of categories included in the first class based on the information regarding the image obtained from a classifier corresponding to the second class.

The information regarding the image obtained from the classifier corresponding to the second class may include information regarding a possibility that the object included in the image corresponds to each of the plurality of categories included in the second class, and the processor may be configured to identify a category corresponding to the object included in the image from among the plurality of categories included in the first class by obtaining information regarding a possibility that the object included in the image corresponds to each of the plurality of categories included in the first class based on the information regarding the possibility.

The first class may include a plurality of categories for identifying whether a product included in the image is faulty, the second class may include a plurality of subcategories including a category regarding a faultiness type of the product and a category regarding a normality type of the product, and the processor may be configured to obtain an appearance image of the product, obtain information regarding an image corresponding to the second class by inputting the obtained appearance image to the artificial intelligence model, and identify whether the product is faulty by obtaining information regarding an image corresponding to the first class based on the information regarding the image corresponding to the second class.

The artificial intelligence model may include at least one artificial neural network among a convolutional neural network (CNN) and a recurrent neural network (RNN).

The processor may be configured to convert the obtained image into a gray scale image and input the converted gray scale image to the artificial intelligence model.

In accordance with another aspect of the disclosure, there is provided a method for controlling an electronic device, the method including obtaining an image, inputting the obtained image to a trained artificial intelligence model, and obtaining information regarding the image from each of a plurality of classifiers which corresponds to each of a plurality of classes divided according to higher and lower concepts of an object included in the image and is included in the artificial intelligence model.

The plurality of classes may include a plurality of categories for classifying the object included in the image for each of the plurality of classes, and the information regarding the image may include information regarding a category corresponding to the object included in the image from among the plurality of categories included in each of the plurality of classes.

The method for controlling the electronic device may further include training the artificial intelligence model, the obtaining the information regarding the image may include obtaining a plurality of loss function values corresponding to each of the plurality of classes based on information regarding the image obtained from each of the plurality of classifiers, and the training the artificial intelligence model may include training the artificial intelligence model by performing backpropagation of a total loss function value obtained by adding up the plurality of loss function values so that the total loss function value becomes a minimum value.

The method for controlling the electronic device may further include obtaining a feature value of the image by inputting the image to the artificial intelligence model, the obtaining the information regarding the image may include obtaining information regarding the image from each of the plurality of classifiers by inputting the obtained feature value of the image to the plurality of classifiers.

The method for controlling the electronic device may further include identifying a category, the plurality of classes may include a first class and a second class including a plurality of subcategories of each of a plurality of categories included in the first class, and the identifying the category may include identifying a category corresponding to the object included in the image from among the plurality of categories included in the first class based on the information regarding the image obtained from a classifier corresponding to the second class.

The information regarding the image obtained from the classifier corresponding to the second class may include information regarding a possibility that the object included in the image corresponds to each of the plurality of categories included in the second class, and the identifying the category may include identifying a category corresponding to the object included in the image from among the plurality of categories included in the first class by obtaining information regarding a possibility that the object included in the image corresponds to each of the plurality of categories included in the first class based on the information regarding the possibility.

The first class may include a plurality of categories for identifying whether a product included in the image is faulty, the second class may include a plurality of subcategories including a category regarding a faultiness type of the product and a category regarding a normality type of the product, and the obtaining the image may include obtaining an appearance image of the product, the obtaining the information regarding the image may include obtaining information regarding an image corresponding to the second class by inputting the obtained appearance image of the product to the artificial intelligence model, and the identifying the category may include identifying whether the product is faulty by obtaining information regarding an image corresponding to the first class based on the information regarding the image corresponding to the second class.

The artificial intelligence model may include at least one artificial neural network among a convolutional neural network (CNN) and a recurrent neural network (RNN).

The inputting the image to the trained artificial intelligence model may include converting the obtained image into a gray scale image and inputting the converted gray scale image to the artificial intelligence model.

In accordance with still another aspect of the disclose, there is provided a computer-readable recording medium including a program for executing a method for controlling an electronic device, the method for controlling the electronic device including obtaining an image, inputting the obtained image to a trained artificial intelligence model, and obtaining information regarding the image from each of a plurality of classifiers which corresponds to each of a plurality of classes divided according to higher and lower concepts of an object included in the image and is included in the artificial intelligence model.

DETAILED DESCRIPTION OF EXEMPLARY EMBODIMENTS

Figure 1:
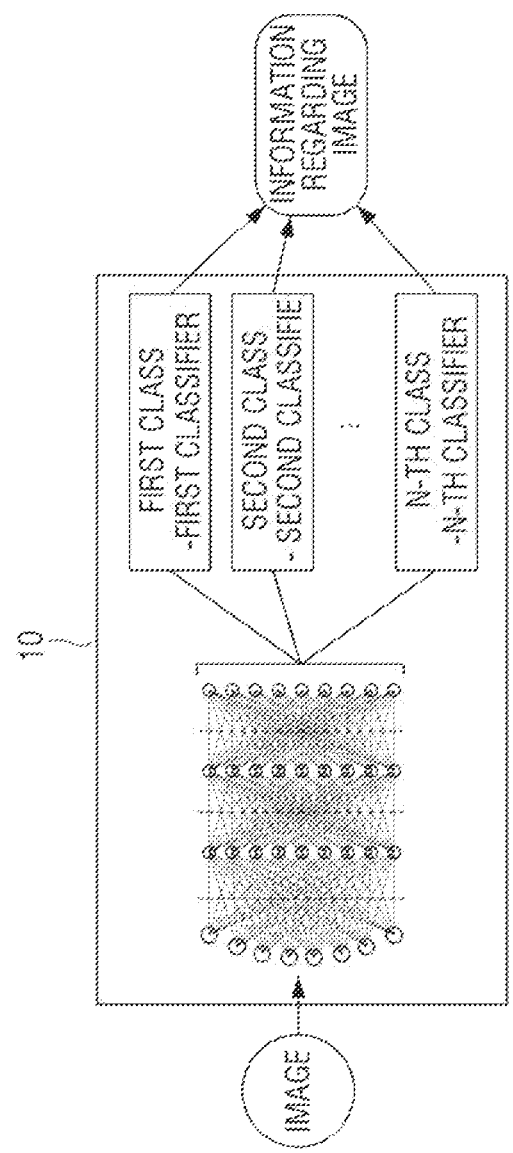
FIG. 1 is a diagram schematically illustrating a process in which an electronic device obtains information regarding an image using an artificial intelligence model according to an embodiment.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In relation to explanation of the drawings, similar reference numerals may be used for similar elements.

In describing the disclosure, a detailed description of the related art or configuration may be omitted when it is determined that the detailed description may unnecessarily obscure a gist of the disclosure.

In addition, the embodiments below may be changed in various forms and the scope of the technical idea of the disclosure is not limited to the embodiments below. The embodiments are provided to complete the disclosure and completely transfer the technical idea of the disclosure to those skilled in the art.

The terms used in the disclosure are merely used for describing specific embodiments and do not limit the scope of a right of the disclosure. Unless otherwise defined specifically, a singular expression may encompass a plural expression.

In the disclosure, the terms such as "comprise", "may comprise", "consist of", or "may consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element).

On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the expression "configured to" does not necessarily refer to a device being "specifically designed to" in terms of hardware.

Instead, under some circumstances, the expression "a device configured to" may refer to the device being "capable of" performing an operation together with another device or component. For example, the phrase "a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

A term such as "module" or a "unit" in the embodiments may perform at least one function or operation, and may be implemented as hardware, software, or a combination of hardware and software. Further, except for when each of a plurality of "modules", "units", and the like needs to be realized in an individual hardware, the components may be integrated in at least one module and be implemented in at least one processor.

Meanwhile, various elements and areas in the drawings are schematically illustrated. Therefore, the technical spirit of the disclosure is not limited by comparative sizes or intervals illustrated in the accompanying drawings.

Hereinafter, with reference to the accompanying drawings, embodiments of the disclosure will be described in detail for those skilled in the art to easily practice the embodiments.

FIG. 1 is a diagram schematically illustrating a process in which an electronic device obtains information regarding an image using an artificial intelligence model according to an embodiment.

As illustrated in FIG. 1, an electronic device according to the disclosure may obtain an image and obtain information regarding the image by inputting the obtained image to a trained artificial intelligence model 10. In addition, the artificial intelligence model 10 according to an embodiment of the disclosure may include a plurality of classifiers.

The artificial intelligence model 10 may be the artificial intelligence model 10 trained using at least one of artificial intelligence algorithms such as machine learning, neural network, gene, deep learning, and a classification algorithm. Particularly, the artificial intelligence model 10 according to the disclosure may include an artificial neural network such as a convolutional neural network (CNN) but is not limited thereto. The artificial intelligence model 10 according to the disclosure will be described later in detail.

The classifier may classify the input image into at least one category of a plurality of categories and output information corresponding to the classification result and may be implemented based on the artificial neural network such as CNN.

Meanwhile, the artificial intelligence model 10 according to the disclosure includes the plurality of classifiers, and accordingly, the plurality of classifiers correspond to a plurality of classes, respectively. Specifically, as illustrated in FIG. 1, the artificial intelligence model 10 may include a first classifier corresponding to a first class, a second classifier corresponding to a second class, . . . , and an n-th classifier corresponding to an n-th class.

In addition, the plurality of classes may be divided according to higher and lower concepts of an object included in the image. In addition, the plurality of classes may include a plurality of categories for classifying objects included in the image for each of the plurality of classes. Herein, the plurality of classes and the plurality of categories may be configured by reflecting field data features of various technical fields.

Specifically, the plurality of classes may include a first class and a second class including a plurality of subcategories of each of a plurality of categories included in the first class. In addition, the plurality of classes may further include a third class including a plurality of subcategories of each of a plurality of categories included in the second class.

Meanwhile, the plurality of classes and the plurality of categories described above may be configured in advance based on a well-known data set and stored in the electronic device, and the plurality of classes and the plurality of categories may also be configured by a user's command.

An image input to the artificial intelligence model 10 may specifically refer to digital image data or may be digital image data subjected to a preprocessing process for speed and efficiency of an operation process.

The information regarding the image output from the artificial intelligence model 10 may include information regarding a category corresponding to an object included in the image from among the plurality of categories included in each of the plurality of classes. Specifically, the information regarding the image may include information regarding a possibility that the object included in the image corresponds to each of the plurality of categories included in each of the plurality of classes.

Meanwhile, the electronic device may obtain the information regarding the image from each of the plurality of classifiers respectively corresponding to the plurality of classes divided according to the higher and lower concepts of the object included in the image. Accordingly, the electronic device may obtain various pieces of information based on division criteria different according to each of the plurality of classes.

In other words, the electronic device according to the disclosure does not obtain the information regarding the image based on a plurality of categories defined horizontally under one class, but may obtain the information regarding the image based on a plurality of categories defined horizontally in each of the plurality of classes divided vertically according to higher and lower concepts of the object included in the image.

Meanwhile, the electronic device may train the artificial intelligence model 10 based on the information regarding the image obtained from each of the plurality of classifiers.

For example, the electronic device may train the artificial intelligence model 10 by using information regarding the image obtained from a classifier corresponding to the first class, information regarding the image obtained from a classifier corresponding to the second class, and information regarding the image obtained from a classifier corresponding to the third class overall.

Specifically, the electronic device may obtain a plurality of loss function values respectively corresponding to the plurality of classes based on the information regarding the image obtained from each of the plurality of classifiers. In addition, the electronic device may train the artificial intelligence model 10 by performing backpropagation of a total loss function value obtained by adding up the plurality of loss function values so that the total loss function value becomes a minimum value.

The loss function herein is a type of an index for determining an optimal weight parameter in an artificial intelligence model through training, and the training of the artificial intelligence model may be a process of adjusting the weight parameter for reducing a result value (error) of the loss function.

In general, a mean squared error (MSE) or a cross entropy error (CEE) is generally used for the loss function, but the disclosure is not limited to a certain type of the loss function, and the specific method of the artificial intelligence training of the disclosure is not limited, either, as long as it is within the scope for achieving the object of the disclosure.

As described above, in the training of the artificial intelligence model 10, the electronic device according to the disclosure may use information of various features obtained under division criteria different according to each of the plurality of classes while being organically related to each other according to higher and lower concepts. In other words, according to the disclosure, the artificial intelligence model 10 may be trained based on features of various levels according to the plurality of classes. Therefore, it is possible to improve a training effect, compared to a case of training the artificial intelligence model 10 based on information obtained under one class.

In addition, it is possible to satisfy features of the image recognition required in various technical fields by obtaining the information regarding the image corresponding to the plurality of classes and the plurality of categories which reflect the field data features of various technical fields.

Meanwhile, the electronic device may perform the image recognition by using the artificial intelligence model 10 trained as described above. In other words, the electronic device may obtain the information regarding the image by inputting the image to the artificial intelligence model 10 and identify a category corresponding to the object included in the image based on the obtained information regarding the image. The image recognition according to the disclosure is directly connected to classification of images, but hereinafter, the image recognition and the image classification are collectively referred to as image recognition.

Meanwhile, as described above, in the training of the artificial intelligence model 10, as an amount and diversity of training data are high, a higher training effect is expected, and accordingly, it may be efficient to use all of information regarding the image obtained from each of the plurality of classifiers respectively corresponding to the plurality of classes.

However, when using the artificial intelligence model 10, it may be efficient to use only a part of information contributing to accurate image recognition from among the information regarding the image obtained from each of the plurality of classifiers, rather than using all of information regarding the image obtained from each of the plurality of classifiers.

In particular, in the image recognition using the artificial intelligence model 10, it may be efficient to use only information regarding an image obtained from a classifier corresponding to a lowest class which is a class including a plurality of categories according to most specific classification criteria from among the plurality of classes, to identify a category corresponding to the object included in the image from among a plurality of categories included in a higher class thereof.

Specifically, according to an embodiment of the disclosure, if the plurality of classes include a first class and a second class including a plurality of subcategories of each of a plurality of categories included in the first class, the electronic device may identify a category corresponding to the object included in the image from among the plurality of categories included in the first class based on information regarding the image obtained from a classifier corresponding to the second class.

As described above, the electronic device according to the disclosure may improve an accuracy of the image recognition of the electronic device by using the trained artificial intelligence model 10.

Figure 2:
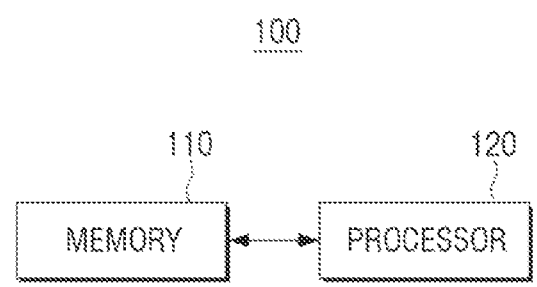
FIG. 2 is a block diagram schematically illustrating a configuration of an electronic device according to an embodiment.
Figure 3:
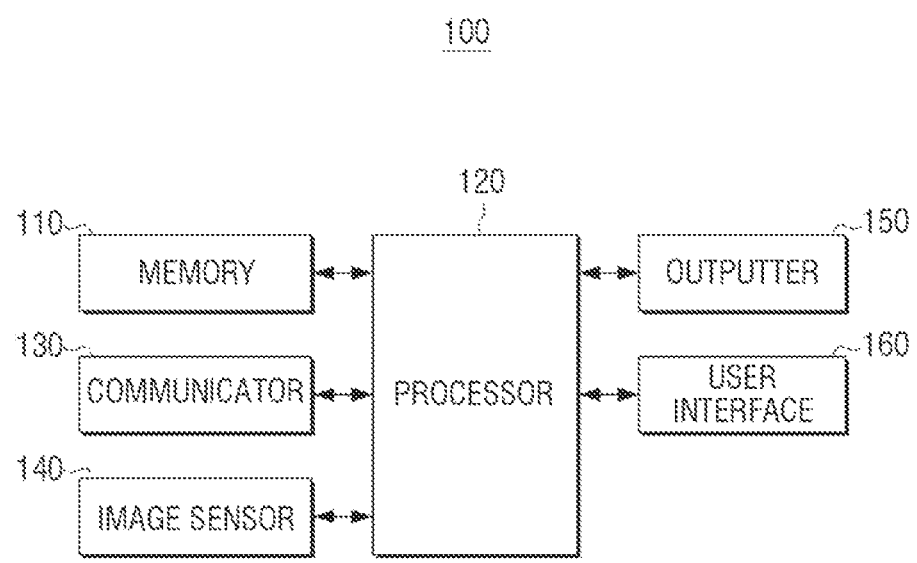
FIG. 3 is a diagram specifically illustrating a configuration of an electronic device according to an embodiment.

FIG. 2 is a block diagram schematically illustrating a configuration of the electronic device according to an embodiment and FIG. 3 is a diagram specifically illustrating a configuration of the electronic device according to an embodiment.

As illustrated in FIG. 2, an electronic device 100 according to an embodiment of the disclosure may include a memory 110 and a processor 120. In addition, as illustrated in FIG. 3, the electronic device 100 according to an embodiment of the disclosure may further include a communicator 130, an image sensor 140, an outputter 150, and a user interface 160. However, this configuration is merely an example and new configuration may be added in addition to the above configuration or some configuration may be omitted when practicing the disclosure.

The memory 110 may store at least one instruction regarding the electronic device 100. The memory 110 may store an operating system (O/S) for operating the electronic device 100. In addition, the memory 110 may store various software programs or applications for operating the electronic device 100 according to various embodiments of the disclosure. Further, the memory 110 may include a semiconductor memory such as a flash memory, a magnetic storage medium such as a hard disk, and the like.

Specifically, the memory 110 may store various software modules for operating the electronic device 100 according to various embodiments of the disclosure and the processor 120 may control the operation of the electronic device 100 by executing the various software modules stored in the memory 110.

In particular, in various embodiments of the disclosure, the artificial intelligence model may be implemented as software and stored in the memory 110, and the processor 120 may execute the software stored in the memory 110 and execute an image recognition process or the like according to the disclosure.

In addition, the memory 110 may store a data set used for configuring the plurality of classes and the plurality of categories according to the disclosure.

The communicator 130 may perform communication with an external device (not illustrated) or a server (not illustrated). In addition, the communicator 130 may include at least one of a Wi-Fi chip, a Bluetooth chip, a wireless communication chip, and an NFC chip.

In particular, in various embodiments of the disclosure, the communicator 130 may communicate with an external device (not illustrated) or a server (not illustrated) to receive image data from the external device (not illustrated) or the server (not illustrated). The processor 120 may obtain an image via the communicator 130.

In addition, if the electronic device 100 according to the disclosure learns and recognizes data in association with the server (not illustrated), the communicator 130 may communicate with the server (not illustrated) as a premise.

The image sensor 140 may convert light incident via a lens into an electric image signal. In addition, the processor 120 may obtain an image regarding a subject via the image sensor 140.

The outputter 150 may output various functions that the electronic device 100 is able to perform. The outputter 150 may include at least one of a display and a speaker.

The user interface 160 may receive a user interaction for controlling general operations of the electronic device 100. Specifically, the user interface 160 may include at least one of a camera, a microphone, and a remote control signal receiver. Meanwhile, the user interface 160 may be implemented as being included in a display as a touch screen.

The processor 120 may control generation operations of the electronic device 100. Specifically, the processor 120 may be connected to the configuration of the electronic device 100 including the memory 110 described above to generally control the operation of the electronic device 100.

The processor 120 may be implemented in various forms. For example, the processor 120 may be implemented as at least one of an application specific integrated circuits (ASICs), an embedded processor, a microprocessor, a hardware control logic, a hardware finite state machine (FSM), and a digital signal processor (DSP).

In addition, the processor 120 may include a ROM, a RAM, a graphic processing unit (GPU), a CPU, and a bus, and the ROM, and the RAM, the graphic processing unit (GPU), and the CPU may be connected to each other via the bus.

In particular, in various embodiments of the disclosure, the processor 120 may control general operations of obtaining an image, obtaining information regarding the image, training the artificial intelligence model, and performing the image recognition using the artificial intelligence model.

Specifically, the processor 120 may obtain the image via the communicator 130 or the image sensor 140 and obtain the information regarding the image by inputting the obtained image to the trained artificial intelligence model.

Herein, the image input to the artificial intelligence model may specifically refer to digital image data or may be digital image data subjected to a preprocessing process for speed and efficiency of an operation process.

In addition, the information regarding the image output from the artificial intelligence model may include information regarding a category corresponding to an object included in the image among a plurality of categories included in each of a plurality of classes. Specifically, the information regarding the image may include the information regarding a possibility that the object included in the image corresponds to each of the plurality of categories included in each of the plurality of classes.

Meanwhile, the processor 120 may obtain the information regarding the image from each of the plurality of classifiers respectively corresponding to the plurality of classes divided according to the higher and lower concepts of the object included in the image. Accordingly, the processor 120 may obtain various pieces of information based on division criteria different according to each of the plurality of classes.

Meanwhile, the processor 120 may train the artificial intelligence model based on the information regarding the image obtained from each of the plurality of classifiers and perform the image recognition using the trained artificial intelligence model.

Specifically, the processor 120 may obtain a plurality of loss function values respectively corresponding to the plurality of classes based on the information regarding the image obtained from each of the plurality of classifiers. In addition, the processor 120 may train the artificial intelligence model by performing backpropagation of a total loss function value obtained by adding up the plurality of loss function values so that the total loss function value becomes a minimum value.

In other words, in the training of the artificial intelligence model, the processor 120 may use information of various features obtained under division criteria different according to each of the plurality of classes while being organically related to each other according to higher and lower concepts. Therefore, it is possible to improve the training effect, compared to a case of training the artificial intelligence model based on information obtained under one class.

Meanwhile, the processor 120 may obtain the information regarding the image by inputting the image to the artificial intelligence model and identify a category corresponding to the object included in the image based on the obtained information regarding the image.

Specifically, according to an embodiment of the disclosure, if the plurality of classes include a first class and a second class including a plurality of subcategories of each of a plurality of categories included in the first class, the processor 120 may identify a category corresponding to the object included in the image from among the plurality of categories included in the first class based on information regarding the image obtained from a classifier corresponding to the second class.

In other words, in the use of the artificial intelligence model, the processor 120 may perform the image recognition more efficiently with a higher accuracy, by using only information regarding an image obtained from a classifier corresponding to a lowest class which is a class including a plurality of categories according to most specific classification criteria from among the plurality of classes, and identifying a category corresponding to the object included in the image from among a plurality of categories included in a higher class thereof.

Hereinafter, the structure of the artificial intelligence model, the training process of the artificial intelligence model, and the image recognition process using the artificial intelligence model according to an embodiment of the disclosure will be described in more detail.

Figure 4:
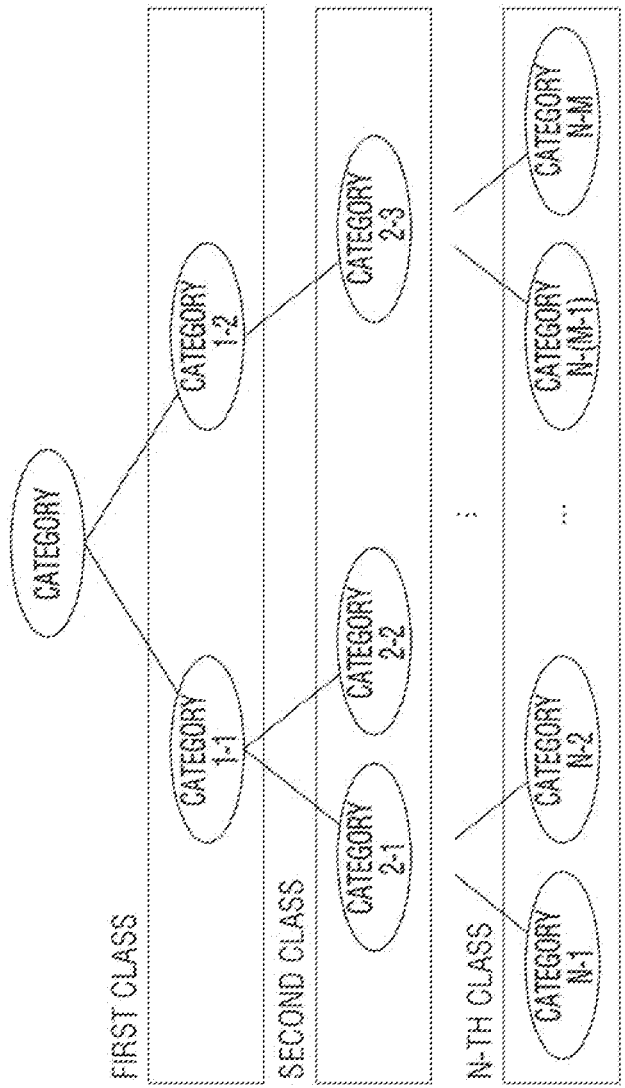
FIG. 4 is a diagram illustrating a plurality of classes and a plurality of categories according to an embodiment.

FIG. 4 is a diagram illustrating a plurality of classes and a plurality of categories according to an embodiment.

As described above, the artificial intelligence model according to the disclosure may include a plurality of classifiers and the plurality of classifiers correspond to the plurality of classes, respectively. The plurality of classes herein may be divided according to the higher and lower concepts of the object included in the image. In addition, the plurality of classes may include a plurality of categories for classifying objects included in the image for each of the plurality of classes.

Specifically, as illustrated in FIG. 4, the plurality of classes may include a first class and a second class which is a lower class of the first class. In addition, the plurality of classes may include an n-th class which is a lower class of an n−1-th class.

The first class may include a category 1-1 and a category 1-2 which are categories for classifying the object included in the image, and the second class may include a category 2-1, a category 2-2, and a category 2-3 which are a plurality of subcategories of each of the plurality of categories included in the first class. In addition, the n-th class may include a category n-1 to a category n-m. Herein, the number of the classes is not particularly limited and the number of categories included in each of the plurality of classes is not particularly limited, either. In other words, n and m indicate arbitrary natural numbers.

For example, the first class of the plurality of classes may include a category of "instrument" and a category of "animal". In addition, the second class may include categories such as "guitar", "base", "drum", and the like which are subcategories of the category of "instrument" of the first class and categories such as "mammals", "reptiles", "birds", and the like which are subcategories of the category of "animal" of the first class. In addition, the third class may include categories such as "electric guitar", "acoustic guitar", and the like which are subcategories of the category "guitar" of the second class and categories such as "cat", "fox", "wolf", and the like which are subcategories of the category of "mammals" of the second class.

Meanwhile, the plurality of classes and the plurality of categories described above may be configured by reflecting field data features of various technical fields. The plurality of classes and the plurality of categories may be configured in advance based on a well-known data set and stored in the electronic device, and the plurality of classes and the plurality of categories may be configured by a user's command.

Figure 5:
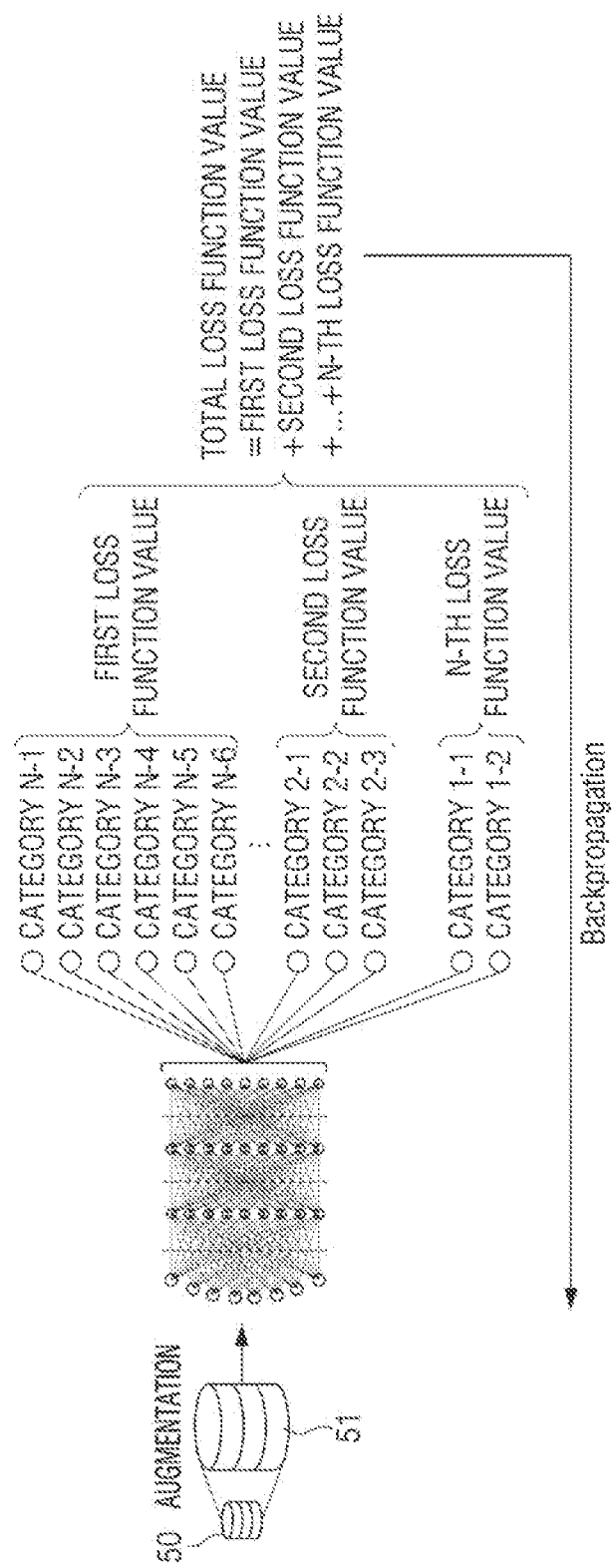
FIG. 5 is a diagram illustrating a training process of an artificial intelligence model according to an embodiment.

FIG. 5 is a diagram illustrating a training process of an artificial intelligence model according to an embodiment.

As described above, the artificial intelligence model according to the disclosure may include a plurality of classifiers.

The artificial intelligence model may be an artificial intelligence model trained using at least one of artificial intelligence algorithms such as machine learning, neural network, gene, deep learning, and a classification algorithm.

Particularly, the artificial intelligence model may be a model based on an artificial neural network and may include a plurality of network nodes including weights so as to simulate neurons of the neural network of human.

The plurality of network nodes may form connections to each other to simulate a synaptic activity of neurons in that the neurons transmit and receive signals through synapse. In addition, the plurality of network nodes may be positioned at depths (or on layers) different from each other and may transmit and receive data according to the convolution connection.

Examples of the artificial neural network included in the artificial intelligence model according to the disclosure may include a convolutional neural network (CNN), a recurrent neural network (RNN), and the like, but there is no limitation thereto in its type, as long as it is in the scope for achieving the object of the disclosure.

In particular, the CNN is a type of an artificial neural network used for convolution operation and is generally used for an artificial intelligence model for image classification. Particularly, in a case of the artificial intelligence model according to the disclosure, a feature value of an image may be obtained via a convolutional class of the CNN and the obtained feature value of the image feature may be input to a classifier.

The classifier may classify the input image to any one category of the plurality of categories and output information corresponding to the classification result thereof, and may be implemented based on the artificial neural network described above.

Meanwhile, as illustrated in FIG. 5, the electronic device according to the disclosure may input the obtained image to the trained artificial intelligence model.

The image input to the artificial intelligence model may specifically refer to digitized image data 50. In addition, the image data 50 may perform preprocessing process for speed and efficiency of the operation process.

Specifically, as a typical method for improving the training effect of the artificial intelligence model, a data augmentation process may be performed and augmented data 51 may be input to the artificial intelligence model. The data augmentation may be a method for changing a pixel of the obtained image data 50 to obtain the changed image data, without changing a label thereof. A degree and a type of the data augmentation may vary depending on the specific embodiment and an amount of training data.

In addition, as a typical method for increasing the training speed of the artificial intelligence model, a process of converting an obtained color image into a gray scale image may be performed. In the process of obtaining the gray scale image, a method using luminance of a color has been mainly used, but the process for obtaining the gray scale image according to the disclosure is not limited to a specific method.

The electronic device may obtain the information regarding the image by inputting the obtained image or the image subjected to the preprocessing process described above to the artificial intelligence model. Specifically, the electronic device may input the image to the trained artificial intelligence model to obtain the information regarding the image from each of the plurality of classifiers corresponding to each of the plurality of classes divided according to higher and lower concepts of the object included in the image.

More specifically, the electronic device may obtain the feature value of the image by inputting the image to the artificial intelligence model, and input the obtained feature value of the image to the plurality of classifiers to obtain the information regarding the image from each of the plurality of classifiers.

Meanwhile, the plurality of classifiers may correspond to the plurality of classes, respectively. In addition, the plurality of classes may be divided according to higher and lower concepts of the object included in the image. In addition, the plurality of classes may include a plurality of categories for classifying the object included in the image for each of the plurality of classes.

Referring to FIG. 5, among the plurality of classifiers according to the disclosure, the first classifier may include the category 1-1 and the category 1-2, the second classifier may include the category 2-1, the category 2-2, and the category 2-3, and the n-th classifier may include the category n−1 to the category n−6.

Meanwhile, the electronic device according to the disclosure may train the artificial intelligence model based on the information regarding the image obtained from each of the plurality of classifiers.

In other words, the electronic device may train the artificial intelligence model using information regarding the image obtained from the classifier corresponding to the first class, information regarding the image obtained from the classifier corresponding to the second class, and information regarding the image obtained from the classifier corresponding to the n-th class overall.

In other words, in the training of the artificial intelligence model, the electronic device may use information of various features obtained under division criteria different according to each of the plurality of classes while being organically related to each other according to higher and lower concepts. Therefore, it is possible to improve the training effect, compared to a case of training the artificial intelligence model based on information obtained under one class.

Specifically, the electronic device may obtain a plurality of loss function values respectively corresponding to the plurality of classes based on the information regarding the image obtained from each of the plurality of classifiers. In addition, the electronic device may train the artificial intelligence model by performing backpropagation of a total loss function value obtained by adding up the plurality of loss function values so that the total loss function value becomes a minimum value.

For example, as illustrated in FIG. 5, the electronic device may obtain a first loss function value corresponding to the first class from the first classifier and obtain a second loss function value corresponding to the second class from the second classifier. In addition, the electronic device may obtain an n-th loss function value corresponding to the n-th class from the n-th classifier.

The electronic device may train the artificial intelligence model based on a total loss function value obtained by adding up the first loss function value to the n-th loss function value. Specifically, the electronic device may train the artificial intelligence model by performing backpropagation of the total loss function value so that the total loss function value becomes a minimum value.

The loss function herein is a type of an index for determining an optimal weight parameter in an artificial intelligence model through training and the training of the artificial intelligence model may be a process of adjusting the weight parameter for reducing a result value (error) of the loss function.

In general, a mean squared error (MSE) or a cross entropy error (CEE) are generally used for the loss function, but the disclosure is not limited to a certain type of the loss function, and the specific method of the artificial intelligence training of the disclosure is not limited, either, as long as it is within the scope for achieving the object of the disclosure.

According to an embodiment of the disclosure described above, the artificial intelligence model may be trained in an end-to-end manner by setting the image as an input value and setting the total loss function value obtained by adding up the loss function value of each of the plurality of classifiers as an output value. Therefore, it is possible to obtain the training effect which is the same effect as in a case of using a plurality of artificial intelligence models, from one artificial intelligence model.

Figure 6:
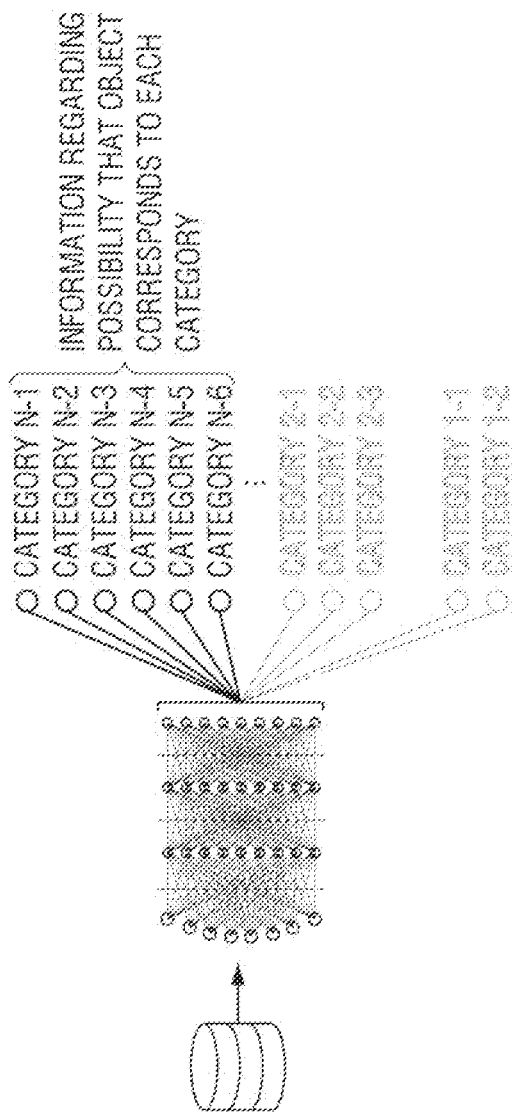
FIG. 6 is a diagram illustrating a process of performing image recognition using an artificial intelligence model according to an embodiment.

FIG. 6 is a diagram illustrating a process of performing image recognition using an artificial intelligence model according to an embodiment.

As illustrated in FIG. 6, the electronic device according to the disclosure may perform the image recognition by inputting the image to the artificial intelligence model. In other words, the electronic device may obtain the information regarding the image by inputting the image to the artificial intelligence model and identify a category corresponding to the object included in the image based on the obtained information regarding the image.

However, in the training of the artificial intelligence model, as an amount and diversity of training data are high, a higher training effect is expected, and accordingly, it may be efficient to use all of information regarding the image obtained from each of the plurality of classifiers respectively corresponding to the plurality of classes divided according to higher and lower concepts.

However, when using the artificial intelligence model, it may be efficient to use only a part of information contributing to more accurate image recognition from among the information regarding the image obtained from each of the plurality of classifiers, rather than using all of information regarding the image obtained from each of the plurality of classifiers. A part of the information that is able to contribute to the accurate image recognition may vary depending on the field data features or the like of the various technical fields in which the disclosure may be applied.

In particular, in the image recognition using the artificial intelligence model, it may be efficient to use only information regarding an image obtained from a classifier corresponding to a lowest class which is a class including a plurality of categories according to most specific classification criteria from among the plurality of classes, to identify a category corresponding to the object included in the image from among a plurality of categories included in a higher class thereof.

Specifically, as illustrated in FIG. 6, when the plurality of classes include a first class, a second class which is a lower class of the first class, and an n-th class which is a lower class of an n−1-th class, the electronic device may identify a category corresponding to the object included in the image from among the plurality of categories included in the higher class of the n-th class based on the information regarding the image obtained from the classifier corresponding to the n-th class.

In addition, when the plurality of classes include the first class and the second class which is a lower class of the first class, the electronic device may identify a category corresponding to the object included in the image from among the plurality of categories included in the first class based on the information regarding the image obtained from the classifier corresponding to the second class.

Specifically, when the plurality of classes include the first class and the second class which is a lower class of the first class, the electronic device may obtain information regarding the image from the classifier corresponding to the second class and the information regarding the image herein may include information regarding a possibility that the object included in the image corresponds to each of the plurality of categories included in the second class.

In addition, the electronic device may obtain information regarding a possibility that the object included in the image corresponds to each of the plurality of categories included in the first class based on the information regarding the possibility obtained from the classifier corresponding to the second class and identify a category corresponding to the object included in the image from among the plurality of categories included in the first class.

Hereinabove, the embodiment according to the disclosure of the electronic device which trains the artificial intelligence model and perform the image recognition using the trained artificial intelligence model has been described.

Hereinafter, as a more specific embodiment, an embodiment regarding a case of using the electronic device according to the disclosure for identification of faultiness of a product will be described. However, the overlapped description regarding FIGS. 1 to 6 will not be repeated.

Figure 7:
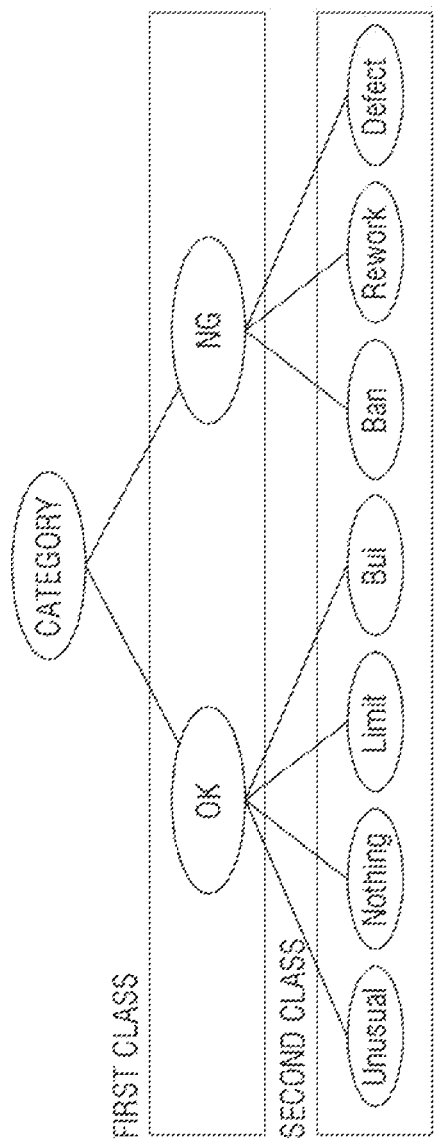
FIGS. 7 to 9 are diagrams for respectively illustrating a plurality of classes and a plurality of categories, a training process of an artificial intelligence model, and a use process of an artificial intelligence model according to an embodiment regarding product faultiness identification.
Figure 8:
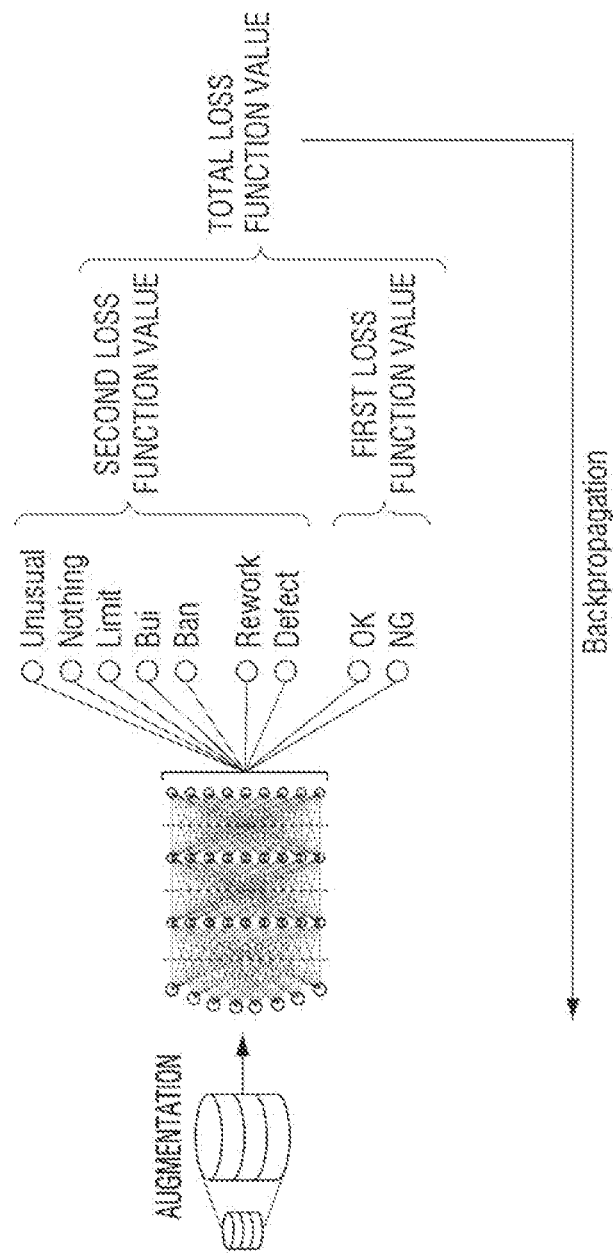
Figure 9:
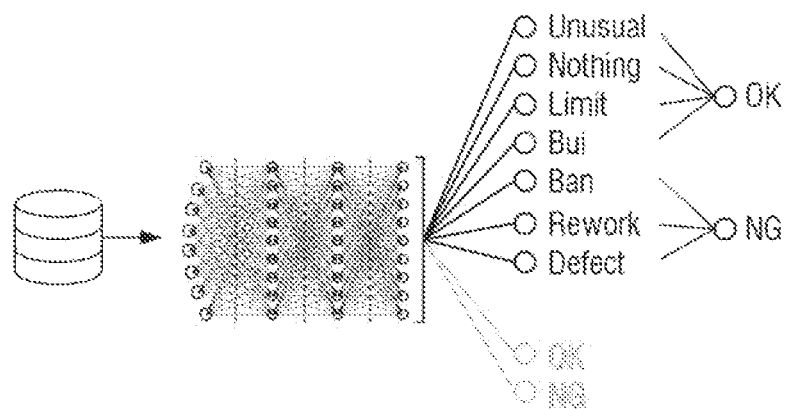

FIGS. 7 to 9 are diagrams for respectively illustrating a plurality of classes and a plurality of categories, a training process of an artificial intelligence model, and a use process of an artificial intelligence model according to an embodiment regarding product faultiness identification.

As illustrated in FIG. 7, a plurality of classes according to an embodiment regarding product faultiness identification of the disclosure may include a first class and a second class which is a lower class of the first class. The first class may include "normal (OK)" and "faulty (NG)" categories as categories for identifying the faultiness of the product.

In addition, the second class may include "abnormal input (unusual)", "no defect (nothing)", "limit faulty (limit)", and "stain (bui)" categories which are subcategories of the "normal (OK)" category included in the first class and "scratch (ban)", "need to re-inspect (rework)", and "defect (defect)" categories which are subcategories of the "faulty (NG)" category included in the first class, as the categories regarding the faultiness type of the product.

Meanwhile, the plurality of classes and the plurality of categories described above may be variously configured by reflecting field data features of various technical fields.

In other words, the plurality of classes and the plurality of categories may be configured differently depending on specific criteria regarding a type of a target product and the faultiness inspection. In particular, the faultiness inspection may be performed only for the normal input by separately providing a filter regarding the "abnormal input (unusual)", but it may be configured as one of the categories of the normal type as described above by considering the performance and efficiency thereof.

Meanwhile, the electronic device according to the disclosure may obtain an appearance image of a product. In addition, the electronic device may obtain information regarding the appearance image of the product from each of the plurality of classifiers corresponding to each of the plurality of classes by inputting the obtained appearance image of the product to the artificial intelligence model.

In addition, the electronic device may train the artificial intelligence model using the information regarding the image obtained from the classifier corresponding to the first class and the information regarding the image obtained from the classifier corresponding to the second class overall. It has been described above that the training effect may be improved compared to a case of training the artificial intelligence model based on only information obtained under one class.

Specifically, compared to a case of using only the information according to the classification criteria of the categories such as "abnormal input (unusual)", "no defect (nothing)", "limit faulty (limit)", "stain (bui)", "scratch (ban)", "need to re-inspect (rework)", and "defect (defect)" which are categories included in the second class, it is possible to improve the training effect of the artificial intelligence model in a case of also using the information according to the classification criteria of the categories such as "normal (OK)" and "faulty (NG)" which are categories included in the first class.

Specifically, as illustrated in FIG. 8, the electronic device may obtain a first loss function value corresponding to the first class from the first classifier and obtain a second loss function value corresponding to the second class from the second classifier.

In addition, the electronic device may train the artificial intelligence model based on a total loss function value obtained by adding up the first loss function value and the second loss function value. Specifically, the electronic device may train the artificial intelligence model by performing backpropagation of the total loss function value so that the total loss function value becomes a minimum value.

Meanwhile, the electronic device may identify whether the product is faulty using the trained artificial intelligence model. Specifically, the electronic device may obtain the information regarding the appearance image of the product by inputting the obtained appearance image of the product to the artificial intelligence model and identify whether a product is faulty, a faultiness type of a product, and a normality type of a product based on the obtained information regarding the appearance image of the product.

As described above, in the image recognition using the artificial intelligence model, it may be efficient to use only information regarding an image obtained from a classifier corresponding to a lowest class which is a class including a plurality of categories according to most specific classification criteria from among the plurality of classes, to identify a category corresponding to the object included in the image from among a plurality of categories included in a higher class thereof.

In addition, in the embodiment regarding the product faultiness identification, it may be efficient to identify whether the product is faulty based on information regarding the faultiness type and the normality type obtained from the classifier corresponding to the lowest class from among the plurality of classes.

Specifically, referring to FIG. 9, the electronic device may obtain information regarding the image from the classifier corresponding to the second class and the information regarding the image herein may include information regarding a possibility that the object included in the appearance image of the product corresponds to each of the plurality of categories of "abnormal input (unusual)", "no defect (nothing)", "limit faulty (limit)", "stain (bui)", "scratch (ban)", "need to re-inspect (rework)", and "defect (defect)" included in the second class.

In addition, the electronic device may obtain information regarding a possibility that the object included in the appearance image of the product corresponds to each of the plurality of categories "normal (OK)" and "faulty (NG)" included in the first class based on the information regarding the possibility obtained from the classifier corresponding to the second class, and identify whether the product is faulty.

Specifically, the electronic device may obtain a possibility value that the object included in the appearance image of the product corresponds to each of the plurality of categories included in the second class from the classifier corresponding to the second class. In addition, the electronic device may add up the obtained possibility values for each of the categories "normal (OK)" and "faulty (NG)" to obtain a possibility value that the object included in the appearance image of the product corresponds to each of the "normal (OK)" and "faulty (NG)", and identify whether the product is faulty.

According to an embodiment of the disclosure described above, a more reliable faultiness inspection result may be obtained by identifying whether the product is faulty using the artificial intelligence model capable of performing accurate image recognition.

Accordingly, in a case of a technology recently introduced for faultiness inspection, a general deep neutral network (DNN) structure is used, and accordingly, it is possible to solve a problem regarding a limit in performance improvement due to the field data features which are not sufficiently reflected.

Figure 10:
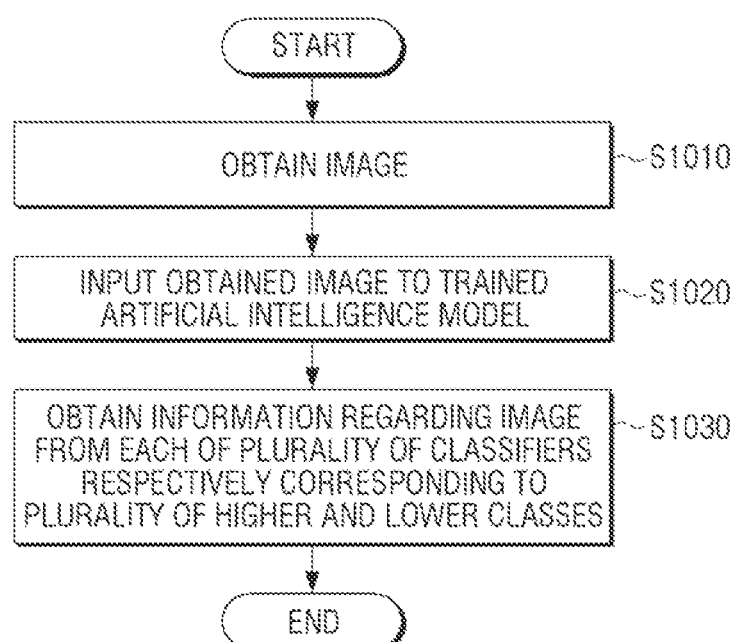
FIG. 10 is a diagram illustrating a method for controlling an electronic device according to an embodiment.

FIG. 10 is a diagram illustrating a method for controlling an electronic device according to an embodiment.

As illustrated in FIG. 10, according to a method for controlling an electronic device according to an embodiment of the disclosure, the electronic device may obtain an image (S1010). An image input to the artificial intelligence model may specifically refer to digital image data.

When the image is obtained, the electronic device may input the obtained image to the trained artificial intelligence model (S1020). The artificial intelligence model includes the plurality of classifiers, and accordingly, the plurality of classifiers correspond to a plurality of classes, respectively. In addition, the plurality of classes may be divided according to higher and lower concepts of an object included in the image. In addition, the plurality of classes may include a plurality of categories for classifying objects included in the image for each of the plurality of classes.

When the obtained image is input to the artificial intelligence model, the electronic device may obtain information regarding the image from each of the plurality of classifiers included in the artificial intelligence model (S1030). Specifically, the information regarding the image output from the artificial intelligence model may include information regarding a category corresponding to an object included in the image among a plurality of categories included in each of a plurality of classes.

Meanwhile, the method for controlling the electronic device according to the disclosure may further include training the artificial intelligence model based on the obtained information regarding the image.

Specifically, the electronic device may obtain a plurality of loss function values respectively corresponding to the plurality of classes based on the information regarding the image obtained from each of the plurality of classifiers. In addition, the electronic device may obtain a total loss function value by adding up the obtained plurality of loss function values, and train the artificial intelligence model by performing backpropagation of the obtained total loss function value so that the total loss function value becomes a minimum value.

Meanwhile, the method for controlling the electronic device according to the disclosure may further include identifying a category corresponding to the object included in the image from among the plurality of categories included in at least one class of the plurality of classes using the artificial intelligence model based on the obtained information regarding the image.

Specifically, if the plurality of classes include a first class and a second class including a plurality of subcategories of each of a plurality of categories included in the first class, the electronic device may obtain information regarding a possibility that the object included in the image corresponds to each of the plurality of categories included in the second class.

In addition, the electronic device may obtain information regarding a possibility that the object included in the image corresponds to each of the plurality of categories included in the first class based on the information regarding the possibility that the object corresponds to each of the plurality of categories included in the second class, and identify a category corresponding to the object included in the image from among the plurality of categories included in the first class.

Meanwhile, the method for controlling the electronic device according to the embodiment described above may be implemented as a program and provided in the electronic device. In particular, a program including the method for controlling the electronic device may be stored and provided in a non-transitory computer readable medium.

Specifically, in the computer readable medium including the program for executing the method for controlling the electronic device, the method for controlling the electronic device may include obtaining an image, inputting the obtained image to a trained artificial intelligence model, and obtaining information regarding an image from each of a plurality of classifiers which corresponds to each of a plurality of classes divided according to higher and lower concepts of an object included in the image and is included in the artificial intelligence model.

Meanwhile, the non-transitory computer-readable medium is not a medium storing data for a short period of time such as a register, a cache, or a memory, but may refer to a medium that semi-permanently stores data and is readable by a machine. Specifically, the various applications or programs described above may be stored and provided in the non-transitory computer-readable medium such as a CD, a DVD, a hard disk drive, a Blu-ray disc, a USB, a memory card, and a ROM.

Figure 11:
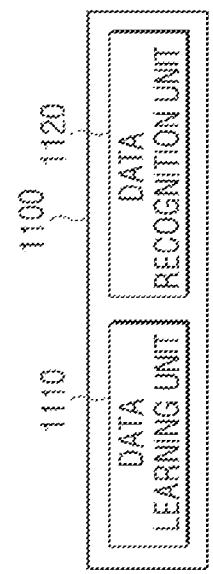
FIGS. 11 to 13 are block diagrams illustrating a configuration of a processor according to an embodiment.
Figure 12:
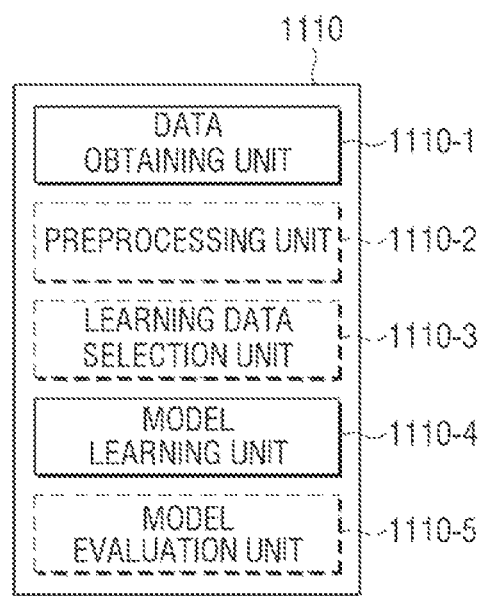
Figure 13:
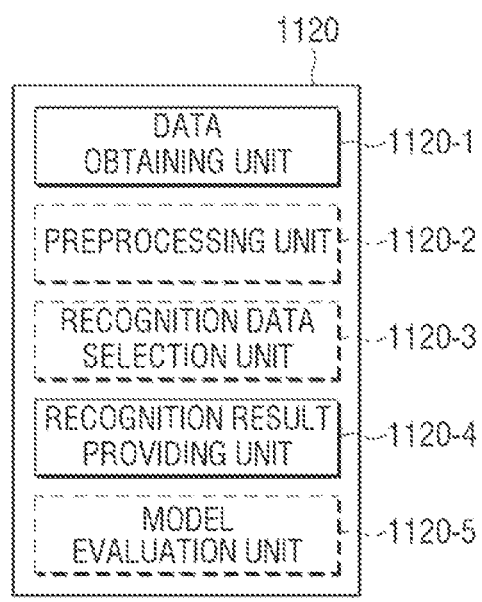

FIGS. 11 to 13 are block diagrams illustrating a configuration of a processor according to an embodiment.

Referring to FIG. 11, a processor 1100 according to an embodiment may include a data learning unit 1110 and a data recognition unit 1120.

The data learning unit 1110 may learn criteria for image recognition according to the disclosure. The data learning unit 1110 may learn criteria regarding which data is to be used for the image recognition and how the image recognition is to be performed using the data. The data learning unit 1110 may learn the criteria for the image recognition by obtaining data used for the training and applying the obtained data to the artificial intelligence model.

The data recognition unit 1120 may output a result regarding the image recognition. The data recognition unit 1120 may output a result regarding the image recognition from predetermined data using the trained artificial intelligence model.

Specifically, the data recognition unit 1120 may obtain the predetermined data according to preset criteria by the training and output a result regarding the image recognition using the artificial intelligence model by setting the obtained data as an input value. In addition, a result value output by the data recognition model by setting the obtained data as an input value may be used for updating the artificial intelligence model.

At least one of the data learning unit 1110 and the data recognition unit 1120 may be manufactured in a form of at least one hardware chip and mounted on the electronic device. For example, at least one of the data learning unit

1110 and the data recognition unit 1120 may be manufactured in a form of a dedicated hardware chip for artificial intelligence (AI) and may be manufactured as a part of the conventional generic-purpose processor (e.g., CPU or application processor) or a graphic dedicated processor (e.g., GPU) and mounted on various electronic devices described above.

In this case, the data learning unit 1110 and the data recognition unit 1120 may be mounted on one electronic device 100 or may be mounted on separate electronic devices, respectively. For example, one of the data learning unit 1110 and the data recognition unit 1120 may be included in the electronic device 100 and the other one thereof may be included in a server.

In addition, the data learning unit 1110 and the data recognition unit 1120 may be connected in a wired or wireless manner so that the data learning unit 1110 may provide constructed model information to the data recognition unit 1120 and the data input to the data recognition unit 1120 may be provided to the data learning unit 1110 as additional learning data.

Meanwhile, at least one of the data learning unit 1110 and the data recognition unit 1120 may be implemented as one software module. If at least one of the data learning unit 1110 and the data recognition unit 1120 is implemented as a software module (or a program module including instructions), the software module may be stored in a non-transitory computer readable medium.

In this case, at least one software module may be provided by an operating system (O/S) or provided by a predetermined application. In addition, a part of the at least one software module may be provided by the operating system (O/S) and the other part may be provided by the predetermined application.

FIG. 12 is a block diagram of the data learning unit according to an embodiment.

Referring to FIG. 12, the data learning unit 1110 according to an embodiment of the disclosure may include a data obtaining unit 1110-1, a preprocessing unit 1110-2, a learning data selection unit 1110-3, a model learning unit 1110-4, and a model evaluation unit 1110-5.

The data obtaining unit 1110-1 may obtain data for image recognition. In addition, the data obtaining unit 1110-1 may obtain data necessary for training for the image recognition.

The preprocessing unit 1110-2 may preprocess the obtained data so that the obtained data is used for the training for the image recognition. The preprocessing unit 1110-2 may process the obtained data in a preset format so that the model learning unit 1110-4 which will be described later may use the obtained data for training for the image recognition.

The learning data selection unit 1110-3 may select data necessary for the training from among the preprocessed data. The selected data may be provided to the model learning unit 1110-4. The learning data selection unit 1110-3 may select data necessary for training from among the preprocessed data according to preset criteria for the image recognition. In addition, the learning data selection unit 1110-3 may select data according to preset criteria by the training by the model learning unit 1110-4 which will be described later.

The model learning unit 1110-4 may learn criteria regarding how the image recognition is to be performed based on the learning data. In addition, the model learning unit 1110-4 may learn criteria regarding which learning data is to be used for the image recognition.

Further, the model learning unit 1110-4 may train the artificial intelligence model used for the image recognition by using the learning data. In this case, the artificial intelligence model may be a model constructed in advance. For example, the artificial intelligence model may be a model constructed in advance by receiving basic learning data.

The artificial intelligence model may be constructed in consideration of an applied field of the artificial intelligence model, an object of learning, computer performance of a device, and the like. The artificial intelligence model may be a model based on a neural network. For example, a model such as a convolutional neural network (CNN), a recurrent neural network (RNN), or a bidirectional recurrent deep neural network (BRDNN) may be used as a learning model but is not limited thereto.

According to various embodiments, if there are a plurality of each of a first learning model, a second learning model, and a third learning model constructed in advance, the model learning unit 1110-4 may select a learning model that is highly relevant to the input learning data and basic learning data.

In this case, the basic learning data may be classified in advance for each type of data and the learning model may be constructed in advance for each type of data. For example, the basic learning data may be classified in advance based on various criteria such as a region where the learning data is generated, time when the learning data is generated, a size of the learning data, a genre of the learning data, a creator of the learning data, a type of an object in the learning data, and the like.

In addition, the model learning unit 1110-4 may train the data recognition model, for example, by using a learning algorithm including error backpropagation or gradient descent, but there is no limitation thereto.

Further, the model learning unit 1110-4 may train the artificial intelligence model through supervised learning using the learning data as an input value. In addition, the model learning unit 1110-4 may train the artificial intelligence model, for example, through unsupervised learning of self-training the necessary type of data without particular supervision. Further, the model learning unit 1110-4 may train the artificial intelligence model, for example, through reinforcement learning using a feedback regarding whether the output result by the training is correct.

When the artificial intelligence model is trained, the model learning unit 1110-4 may store the trained artificial intelligence model. In this case, the model learning unit 1110-4 may store the trained artificial intelligence model in a memory of the electronic device 100 including the data recognition unit 1120.

Alternatively, the model learning unit 1110-4 may store the trained artificial intelligence model in a memory of the electronic device 100 including the data recognition unit 1120 which will be described later. Alternatively, the model learning unit 1110-4 may store the trained artificial intelligence model in a memory of a server connected to the electronic device via a wired or wireless network.

In this case, the memory for storing the trained artificial intelligence model may also store, for example, an instruction or data related to at least another element of the electronic device. In addition, the memory may store a software and/or program. The program may include, for example, a kernel, middleware, an application programming interface (API), and/or an application program (or "application").

The model evaluation unit 1110-5 may input evaluation data to the artificial intelligence model, and cause the model learning unit 1110-4 to perform the training again, if a result output from the evaluation data does not satisfy a predetermined standard. In this case, the evaluation data may be preset data for evaluating the artificial intelligence model.

Meanwhile, at least one of the data obtaining unit 1110-1, the preprocessing unit 1110-2, the learning data selection unit 1110-3, the model learning unit 1110-4, and the model evaluation unit 1110-5 in the data learning unit 1110 may be manufactured in a form of at least one hardware chip and mounted on the electronic device.

For example, at least one of the data obtaining unit 1110-1, the preprocessing unit 1110-2, the learning data selection unit 1110-3, the model learning unit 1110-4, and the model evaluation unit 1110-5 may be manufactured in a form of a dedicated hardware chip for artificial intelligence (AI), or may be manufactured as a part of the conventional generic-purpose processor (e.g., CPU or application processor) or a graphic dedicated processor (e.g., GPU) and mounted on various electronic devices described above.

In addition, the data obtaining unit 1110-1, the preprocessing unit 1110-2, the learning data selection unit 1110-3, the model learning unit 1110-4, and the model evaluation unit 1110-5 may be mounted on one electronic device or may be mounted on each of separate electronic devices. For example, some of the data obtaining unit 1110-1, the preprocessing unit 1110-2, the learning data selection unit 1110-3, the model learning unit 1110-4, and the model evaluation unit 1110-5 may be included in the electronic device and the others thereof may be included in a server.

In addition, at least one of the data obtaining unit 1110-1, the preprocessing unit 1110-2, the learning data selection unit 1110-3, the model learning unit 1110-4, and the model evaluation unit 1110-5 may be implemented as a software module. If at least one of the data obtaining unit 1110-1, the preprocessing unit 1110-2, the learning data selection unit 1110-3, the model learning unit 1110-4, and the model evaluation unit 1110-5 is implemented as a software module (or program module including an instruction), the software module may be stored in a non-transitory computer readable media.

In addition, in this case, the at least one software module may be provided by an operating system (O/S) or provided by a predetermined application. In addition, a part of the at least one software module may be provided by the operating system (O/S) and the other part may be provided by the predetermined application.

FIG. 13 is a block diagram of the data recognition unit according to an embodiment.

Referring to FIG. 13, the data recognition unit 1120 according to an embodiment may include a data obtaining unit 1120-1, a preprocessing unit 1120-2, a recognition data selection unit 1120-3, a recognition result providing unit 1120-4, and a model updating unit 1120-5.

The data obtaining unit 1120-1 may obtain data for image recognition and the preprocessing unit 1120-2 may preprocess the obtained data so that the obtained data is used for the image recognition. The preprocessing unit 1120-2 may process the obtained data in a preset format so that the recognition result providing unit 1120-4 may use the obtained data for the image recognition.

The recognition data selection unit 1120-3 may select data necessary for the image recognition from among the preprocessed data. The selected data may be provided to the recognition result providing unit 1120-4. The recognition data selection unit 1120-3 may select some or all pieces of the preprocessed data according to preset criteria for the image recognition. In addition, the recognition data selection unit 1120-3 may select data according to the preset criteria by the training of the model learning unit 1110-4.

The recognition result providing unit 1120-4 may perform the image recognition by applying the selected data to the data recognition model. The recognition result providing unit 1120-4 may apply the selected data to the artificial intelligence model by using the data selected by the recognition data selection unit 1120-3 as an input value.

The model updating unit 1120-5 may update the data recognition model based on evaluation regarding the output value provided by the recognition result providing unit 1120-4. For example, the model updating unit 1120-5 may cause the model learning unit 1110-4 to update the data recognition model by providing the output result provided by the recognition result providing unit 1120-4 to the model learning unit 1110-4.

Meanwhile, at least one of the data obtaining unit 1120-1, the preprocessing unit 1120-2, the recognition data selection unit 1120-3, the recognition result providing unit 1120-4, and the model updating unit 1120-5 in the data recognition unit 1120 may be manufactured in a form of at least one hardware chip and mounted on the electronic device.

For example, at least one of the data obtaining unit 1120-1, the preprocessing unit 1120-2, the recognition data selection unit 1120-3, the recognition result providing unit 1120-4, and the model updating unit 1120-5 may be manufactured in a form of a dedicated hardware chip for artificial intelligence (AI), or may be manufactured as a part of the conventional generic-purpose processor (e.g., CPU or application processor) or a graphic dedicated processor (e.g., GPU) and mounted on various electronic devices described above.

In addition, the data obtaining unit 1120-1, the preprocessing unit 1120-2, the recognition data selection unit 1120-3, the recognition result providing unit 1120-4, and the model updating unit 1120-5 may be mounted on one electronic device or may be mounted on each of separate electronic devices. For example, some of the data obtaining unit 1120-1, the preprocessing unit 1120-2, the recognition data selection unit 1120-3, the recognition result providing unit 1120-4, and the model updating unit 1120-5 may be included in the electronic device and the others thereof may be included in a server.

In addition, at least one of the data obtaining unit 1120-1, the preprocessing unit 1120-2, the recognition data selection unit 1120-3, the recognition result providing unit 1120-4, and the model updating unit 1120-5 may be implemented as a software module. If at least one of the data obtaining unit 1120-1, the preprocessing unit 1120-2, the recognition data selection unit 1120-3, the recognition result providing unit 1120-4, and the model updating unit 1120-5 is implemented as a software module (or program module including an instruction), the software module may be stored in a non-transitory computer readable media.

In this case, at least one software module may be provided by an operating system (O/S) or provided by a predetermined application. Alternatively, a part of the at least one software module may be provided by the operating system (O/S) and the other part may be provided by the predetermined application.

Figure 14:
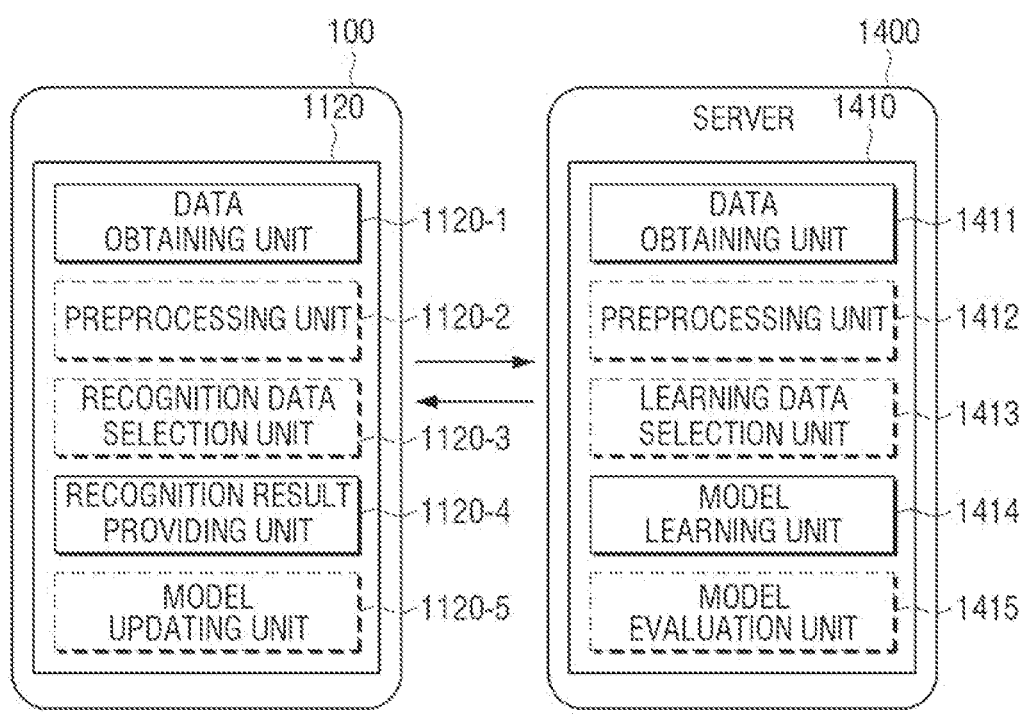
FIG. 14 is a diagram illustrating an example in which an electronic device and a server are associated with each other for training and recognizing data according to an embodiment.

FIG. 14 is a diagram illustrating an example in which an electronic device and a server are associated with each other for training and recognizing data according to an embodiment.

Referring to FIG. 14, a server 1400 may learn criteria for the image recognition and the electronic device 100 may perform the image recognition based on the learning result by the server 1400.

In this case, a model learning unit 1410 of the server 1400 may perform a function of the data learning unit 1110 illustrated in FIG. 12.

The model learning unit 1410 of the server 1400 may learn criteria regarding which data is to be used for the image recognition and how the image recognition is to be performed using the data. The data learning unit 1410 may learn the criteria for the image recognition by obtaining data used for the training and applying the obtained data to the artificial intelligence model.

In this case, from among the data used by the model learning unit 1410, the data related to privacy of a user of the electronic device 100 may be data abstracted by the electronic device 100 according to a predetermined standard.

In addition, the recognition result providing unit 1120-4 of the electronic device 100 may perform the image recognition by applying the data selected by the recognition data selection unit 1120-3 to the artificial intelligence model generated by the server 1400. For example, the recognition result providing unit 1120-4 may transmit the data selected by the recognition data selection unit 1120-3 to the server 1400 and request the server 1400 to perform the image recognition by applying the data selected by the recognition data selection unit 1120-3 to the artificial intelligence model.

In this case, from among the data used by the recognition result providing unit 1120-4 and the recognition data selection unit 1120-3, the data related to the privacy of the user of the electronic device 100 may be data abstracted by the electronic device 100 according to a predetermined standard. In addition, the recognition result providing unit 1120-4 may receive a result value obtained by the server 1400 from the server 1400.

In addition, the recognition result providing unit 1120-4 of the electronic device 100 may receive the artificial intelligence model generated by the server 1400 from the server 1400 and perform the image recognition using the received artificial intelligence model. In this case, the recognition result providing unit 1120-4 of the electronic device 100 may perform the image recognition by applying the data selected by the recognition data selection unit 1120-3 to the artificial intelligence model received from the server 1400.

Hereinabove, according to various embodiments of the disclosure described above, in the training of the artificial intelligence model, information of various features obtained under division criteria different according to each of the plurality of classes while being organically related to each other according to higher and lower concepts may be used. In other words, according to the disclosure, the artificial intelligence model 10 may be trained based on features of various levels according to the plurality of classes. Therefore, it is possible to improve a training effect, compared to a case of training the artificial intelligence model based on information obtained under one class.

The artificial intelligence model may be trained in an end-to-end manner by setting the image as an input value and setting the total loss function value obtained by adding up the loss function value of each of the plurality of classifiers as an output value. Therefore, it is possible to obtain the training effect which is the same effect as in a case of using a plurality of artificial intelligence models, from one artificial intelligence model In addition, it is possible to satisfy features of the image recognition required in various technical fields by obtaining the information regarding the image corresponding to the plurality of classes and the plurality of categories which reflect the field data features of various technical fields.

In addition, the electronic device may perform the image recognition using the artificial intelligence model according to the training effect described above, thereby improving the accuracy of the image recognition of the electronic device.

In particular, according to an embodiment of the disclosure, it is possible to obtain a more reliable faultiness inspection result by identifying whether the product is faulty by using the artificial intelligence model capable of performing accurate image recognition.

Accordingly, in a case of a technology recently introduced for faultiness inspection, a general deep neutral network (DNN) structure is used, and accordingly, it is possible to solve a problem regarding a limit in performance improvement due to the field data features which are not sufficiently reflected.

In this disclosure, the term "unit" or "module" may include a unit implemented with hardware, software, or firmware and may be interchangeably used with terms, for example, logic, logic blocks, parts, or circuits. The "unit" or the "module" may be a part integrally formed or a minimum unit or a part of the part performing one or more functions. For example, the module may be implemented as an application-specific integrated circuit (ASIC).

Various embodiments of the disclosure may be implemented as software including instructions stored in machine (e.g., computer)-readable storage media. The machine is a device which invokes instructions stored in the storage medium and is operated according to the invoked instructions, and may include an electronic device (e.g., electronic device 100) according to the disclosed embodiments.

In a case where the instruction is executed by a processor, the processor may perform a function corresponding to the instruction directly or using other elements under the control of the processor. The instruction may include a code made by a compiler or a code executable by an interpreter.

The machine-readable storage medium may be provided in a form of a non-transitory storage medium. Here, the "non-transitory" storage medium is tangible and may not include signals, and it does not distinguish that data is semi-permanently or temporarily stored in the storage medium.

According to an embodiment, the methods according to various embodiments disclosed in this disclosure may be provided in a computer program product. The computer program product may be exchanged between a seller and a purchaser as a commercially available product.

The computer program product may be distributed in the form of a machine-readable storage medium (e.g., compact disc read only memory (CD-ROM)) or distributed online through an application store (e.g., PlayStore™). In a case of the on-line distribution, at least a part of the computer program product may be at least temporarily stored or temporarily generated in a storage medium such as a memory of a server of a manufacturer, a server of an application store, or a relay server.

Each of the elements (e.g., a module or a program) according to various embodiments described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration.

Operations performed by a module, a program, or other elements, in accordance with various embodiments, may be performed sequentially, in a parallel, repetitive, or heuristically manner, or at least some operations may be performed in a different order, omitted, or may add a different operation.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device comprising:
   a memory comprising at least one instruction; and
   a processor configured to be connected to the memory to control the electronic device,
   wherein the processor, by executing the at least one instruction, is configured to:
      obtain an image, and
      obtain information regarding the image by inputting the obtained image to a trained artificial intelligence model, and
   wherein the artificial intelligence model comprises a plurality of classifiers respectively corresponding to a plurality of classes divided according to higher and lower concepts of an object included in the image, and is configured to obtain information regarding the image from each of the plurality of classifiers,
   wherein the plurality of classes comprises a first class and a second class comprising a plurality of subcategories of each of a plurality of categories included in the first class, and
   wherein the processor is configured to identify a category corresponding to the object included in the image from among the plurality of categories included in the first class based on the information regarding the image obtained from a classifier corresponding to the second class.

2. The device according to claim 1, wherein the plurality of classes comprises a plurality of categories for classifying the object included in the image for each of the plurality of classes, and
   wherein the information regarding the image comprises information regarding a category corresponding to the object included in the image from among the plurality of categories included in each of the plurality of classes.

3. The device according to claim 1, wherein the processor is configured to:
   obtain a plurality of loss function values corresponding to each of the plurality of classes based on information regarding the image obtained from each of the plurality of classifiers; and
   train the artificial intelligence model by performing backpropagation of a total loss function value obtained by adding up the plurality of loss function values so that the total loss function value becomes a minimum value.

4. The device according to claim 1, wherein the processor is configured to:
   obtain a feature value of the image by inputting the image to the artificial intelligence model; and
   obtain information regarding the image from each of the plurality of classifiers by inputting the obtained feature value of the image to the plurality of classifiers.

5. The device according to claim 1, wherein the information regarding the image obtained from the classifier corresponding to the second class comprises information regarding a possibility that the object included in the image corresponds to each of the plurality of categories included in the second class, and
   wherein the processor is configured to identify a category corresponding to the object included in the image from among the plurality of categories included in the first class by obtaining information regarding a possibility that the object included in the image corresponds to each of the plurality of categories included in the first class based on the information regarding the possibility.

6. The device according to claim 1, wherein the first class comprises a plurality of categories for identifying whether a product included in the image is faulty,
   wherein the second class comprises a plurality of subcategories comprising a category regarding a faultiness type of the product and a category regarding a normality type of the product, and
   wherein the processor is configured to,
   obtain an appearance image of the product,
   obtain information regarding an image corresponding to the second class by inputting the obtained appearance image to the artificial intelligence model, and
   identify whether the product is faulty by obtaining information regarding an image corresponding to the first class based on the information regarding the image corresponding to the second class.

7. The device according to claim 1, wherein the artificial intelligence model comprises at least one artificial neural network among a convolutional neural network (CNN) and a recurrent neural network (RNN).

8. The device according to claim 1, wherein the processor is configured to convert the obtained image into a gray scale image and input the converted gray scale image to the artificial intelligence model.

9. A method for controlling an electronic device, the method comprising:
   obtaining an image;
   inputting the obtained image to a trained artificial intelligence model; and
   obtaining information regarding the image from each of a plurality of classifiers which corresponds to each of a plurality of classes divided according to higher and lower concepts of an object included in the image and is included in the artificial intelligence model,
   wherein the method further comprises identifying a category,
   wherein the plurality of classes comprises a first class and a second class comprising a plurality of subcategories of each of a plurality of categories included in the first class, and
   wherein the identifying the category comprises identifying a category corresponding to the object included in the image from among the plurality of categories included in the first class based on the information regarding the image obtained from a classifier corresponding to the second class.

10. The method according to claim 9, wherein the plurality of classes comprises a plurality of categories for classifying the object included in the image for each of the plurality of classes, and
    wherein the information regarding the image comprises information regarding a category corresponding to the object included in the image from among the plurality of categories included in each of the plurality of classes.

11. The method according to claim 9, further comprising: training the artificial intelligence model,
- wherein the obtaining the information regarding the image comprises obtaining a plurality of loss function values corresponding to each of the plurality of classes based on information regarding the image obtained from each of the plurality of classifiers, and
- wherein the training the artificial intelligence model comprises training the artificial intelligence model by performing backpropagation of a total loss function value obtained by adding up the plurality of loss function values so that the total loss function value becomes a minimum value.

12. The method according to claim 9, further comprising: obtaining a feature value of the image by inputting the image to the artificial intelligence model,
- wherein the obtaining the information regarding the image comprises obtaining information regarding the image from each of the plurality of classifiers by inputting the obtained feature value of the image to the plurality of classifiers.

13. A non-transitory computer-readable recording medium comprising a program for executing a method for controlling an electronic device, the method for controlling the electronic device comprising:
- obtaining an image;
- inputting the obtained image to a trained artificial intelligence model; and
- obtaining information regarding the image from each of a plurality of classifiers which corresponds to each of a plurality of classes divided according to higher and lower concepts of an object included in the image and is included in the artificial intelligence model,
- wherein the method further comprises identifying a category,
- wherein the plurality of classes comprises a first class and a second class comprising a plurality of subcategories of each of a plurality of categories included in the first class, and
- wherein the identifying the category comprises identifying a category corresponding to the object included in the image from among the plurality of categories included in the first class based on the information regarding the image obtained from a classifier corresponding to the second class.

* * * * *